3,547,830
Patented Dec. 15, 1970

---

3,547,830
HIGH AREA CATALYST PREPARATION
Joseph A. Shropshire, Westfield, N.J., assignor to Esso Research and Engineering Company, a corporation of Delaware
No Drawing. Filed Mar. 17, 1969, Ser. No. 807,950
Int. Cl. B01j 11/82
U.S. Cl. 252—432                                    10 Claims

ABSTRACT OF THE DISCLOSURE

High-area heterogeneous hydrocarbon conversion catalysts, e.g. cobalt and nickel dispersed on a high-area substrate, e.g. silica and alumina are prepared by the simultaneous precipitation of a catalytic elemental metal, e.g. cobalt, and a substrate, e.g. alumina, in order to provide the maximum dispersion of the catalyst on the substrate and to greatly increase the efficiency of the catalyst. The simultaneous precipitation of the high-surface-area elemental metal catalyst dispersed on the desired substrate is accomplished by (1) solubilizing the transition metal compound with a complexing agent, e.g. citrate, tartrate or amine in an alkaline solution (2) admixing this solution with an alkali metal salt of the desired substrate material, e.g. sodium metasilicate, (3) adding on alkali metal borohydride e.g. sodium borohydride, to the solution; and heating the solution to a temperature in the range of from 40° to 100° C., and thereafter adding a small amount of a mineral acid, e.g. sulfuric acid. The high surface area catalysts so prepared are useful in organic conversion, particularly wherein hydrogen is introduced with the feed, e.g., hydrogenation.

FIELD OF THE INVENTION

This invention relates to the preparation of high surface area heterogeneous hydrocarbon conversion catalysts useful in the conversion of organic feeds, such as in the hydrogenation of organic compounds. More particularly, this invention relates to the preparation of high surface area catalysts by the simultaneous precipitation of catalytic elemental metals on the desired supports such as silica and alumina by low temperature alkalimetal borohydride reduction at controlled pH levels in the presence of a complexing agent. In a preferred embodiment of this invention, high surface area cobalt catalysts dispersed on silica are formed by reducing a solution comprising a cobalt-citrate complex with sodium borohydride in the presence of sodium metasilicate at a temperature in the range of from about 40° to about 100° C. The cobalt-citrate complex is prepared by the addition of sodium citrate to the cobalt compound in the presence of an alkali.

PRIOR ART

Various heavy metals, particularly transition metals and including noble metals, have been previously described as useful for conducting catalytic reactions. For example, hydrogenation catalysts have included solid metals, slurries of metals, metals dispersed on supports, etc. Supported metal catalysts have been prepared by impregnating a support with a salt solution of the desired metal, followed by reduction of the salt, normally in a hydrogen atmosphere at a relatively high temperature, e.g. 900° to 1000° F. However, hydrogen reduction has serious drawbacks in that the required high temperatures often cause sintering of the catalytic metal deposit and severe reduction of the surface area of the catalyst and/or support, resulting in a loss of activity of the catalyst. Additionally, if water solutions are employed to impregnate the support, a calcining operation is necessitated, prior to reduction which may also lead to reduced surface area and further loss of catalytic activity.

It has long been known that alkali-metal borohydride reduction of the transition metals cobalt and nickel results in the production of cobalt and nickel borides when solutions of simple metal salts are employed. It has recently been proposed, however, that under certain conditions the water-soluble alkali metal borohydrides such as sodium borohydride, are effective reducing agents for use in chemical plating of nickel and cobalt. (See U.S. Pat. Nos. 2,942,990 and 3,096,182.) The difficulty of avoiding the precipitation of the nickel and cobalt as their respective boride forms is controlled by adjusting the free alkali content, as measured by the hydroxyl ion content of the bath. The borohydride plating solution functions catalytically to cause a reduction of the nickel or cobalt ions to nickel-boron or cobalt-boron alloys. However, in order to deposit such alloys, in a uniform layer on the surface of a noncatalytic material, the surface of the noncatalytic material must be sensitized by producing a film of catalytic materials on its surface.

It has now been discovered that the simultaneous precipitation of the catalytic elemental transition metal such as cobalt or nickel on an inert substrate carrier such as alumina or silica can be effected in an aqueous solution by an alkali metal borohydride reduction of the transitional metal salts, e.g. cobalt nitrate. The simultaneous precipitation of the catalytic elemental metal and the substrate maximizes contacting of these materials and thus provides maximum dispersion of the catalyst throughout the substrate. The maximum dispersion of the elemental catalyst on the substrate forms a very high surface area catalyst resulting in consequent efficiency and high catalytic activity.

SUMMARY OF THE INVENTION

In accordance with this invention, the simultaneous precipitation of the catalytic elemental transition metal on a support material such as silica or alumina is effected by (1) solubilizing the salt of a transition metal compound selected from the group consisting of cobalt and nickel with a complexing agent comprising an alkali metal citrate, tartrate or amine in an alkaline solution such that the solution has a pH in the range of from about 12 to 14, (2) admixing this solution with an alkali metal salt of the desired substrate such as a silicate or aluminate, (3) and thereafter adding an alkali metal borohydride to the solution. This reaction is conducted at a temperature in the range of from about 40° to about 100° C. with the addition of a slight amount of mineral acid to initiate the borohydride reduction reaction.

It is essential, in accordance with the instant process, to effect the alkali metal borohydride reduction only in the presence of the transition metal-chelating complex. It is essential to avoid the reaction between the transition metal salts and the borohydride present in the solution in the absence of the transition metal-chelating complex in order to avoid the precipitation of the finely-divided transition metals in the form of their respective borides. Thus, in order to effect the reduction of the transition metals to their elemental metallic state, and avoid the precipitation of these metals in the form of their respective borides, it is critical to the process of the instant invention to first form the transition metal-chelating complex. This complex is formed by solubilizing the transition metal salt with an alkali metal citrate, tartrate or an amine in an alkali solution having a pH in the range of from about 12 to 14. Under these pH conditions, the normally expected precipitation of the transition metal hydroxides and oxides which occur at this high pH is prevented by the presence of the chelating complexing agents such as the citrates, tartrates or amines. In addition, under these pH conditions, reduction of the transition metal-chelating agent complex with an alkali metal borohydride results in the precipitation and/or deposition of the elemental transition metals such as cobalt or nickel rather than in the form of the borides of these specific transition metals.

Thus, in accordance with the instant invention, when a solution containing the transition metal complex as described above is mixed with an alkali metal salt of the inert support material such as sodium metasilicate, and then contacted with an alkali metal borohydride, the simultaneous precipitation of the catalytic transitional elemental and substrate is effected so as to provide an extremely high surface area catalyst. While not wishing to be bound to any particular theory, it is believed that the protons produced by the alkali metal borohydride reduction reaction with the catalyst metal salt acidifies the solution of the metal salt and the soluble alkali metal silicate or aluminate (inert substrate material) thereby precipitating gelatinous silica or alumina as well as the elemental metal catalyst. The protons are believed to be produced by the alkali metal borohydride reduction reaction as follows:

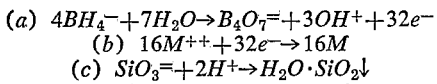

M=divalent metal ion such as Co or Ni.
H$^+$=proton
e$^-$=electrons
(a)=oxidation of borohydride (BH$_4^-$)
(b)=reduction of divalent metal (M$^{++}$)
(c)=precipitation of substrate (SiO$_2$) by protons, H$^+$)

Thus, the alkali metal borohydride is seen not only to reduce the transition metal salt to its catalytic elemental metal but also to provide sufficient protons in solution to precipitate the silicate or alumina substrates. It can be seen that in accordance with the process of the instant invention, maximum dispersion of the catalytic elemental metal is obtained on the inert substrate material by their simultaneous precipitation. Thus, the catalytic material prepared herein differs from simple supported catalysts where only physical bonds between the metal and the support are believed to exist, while at the same time possessing greater surface area.

Conversion catalysts which are prepared in accordance with the above-described process are particularly useful as hydrazine decomposition catalysts and hydrogenation catalysts, but may also be used to promote such conversions as dehydrogenation, reforming, isomerization, hydrocracking, desulfurization, aromatization, dimerization, Fisher-Probst synthesis and the like.

In accordance with the process of this invention, the transition metals which may be employed may include, but are not limited to: iron, cobalt, nickel, platinum, palladium, iridium, and rhodium and mixtures thereof of the foregoing. Nickel and cobalt or their alloys are the more preferred transition metals. The most prefered transition metal is cobalt. While transition metals such as palladium and platinum and the like may be employed, this invention is particularly applicable to cobalt and nickel and mixtures thereof due to the difficulty of reducing cobalt and nickel metals to their elemental state with borohydride reagents. This is due to the fact that the metal ions of Group VIII and noble metals other than cobalt and nickel tend to produce their elemental metals under a variety of methods and conditions to which cobalt and nickel are not amenable.

The anionic component of the transition metal compound is not critical and it is essential only that the resulting compound be soluble in water. Typical examples of anionic components which can be employed in the practice of this invention include but are not limited to the following: nitrates, chlorides, acetates, sulfates, iodides and the like. The preferred anionic salts are nitrates.

The complexing or chelating agents suitable for use in accordance with this invention include the alkali metal salts of an organic carboxylic acid having at least two carboxyl groups, (such as the alkali metal salts of citric, tartaric, adipic, succinic, malonic, oxalic, glutaric, pimelic or maleic acid), as well as amine complexing agents such as ethylene diamine. Typical examples of such salts include, but are not limited to the following: sodium citrate, sodium tartrate, potassium citrate, potassium tartrate, ethylene diamine, hexamethylene tetramine, and the like.

It is essential, as mentioned above, that the solution of the transition metal salt and the alkali metal complexing agent be prepared in an aqueous alkali. Thus, the components, i.e. transition metal compounds, and alkali metal complexing or protective agents, are employed as aqueous solutions. The concentration of cobalt or nickel salt solutions employed may vary between 0.01 and 2 normal depending upon the dispersed metal catalyst concentrations eventually desired, and preferably from 0.02 to 0.5 normal. The chelating complexing agent concentration employed should be at least equal in normality to that of the transition metal salt to be reduced and more preferably about twice the normality of the transition metal salt. The alkali used is preferably ammonium hydroxide and is present in concentration sufficient to bring the pH of the transition metal in-protective agent solution to 12–14. The ammonium hydroxide will normally be 6–8 normal in the solution. Alkali metal hydroxides, such as NaOH, KOH, will require lesser quantities. The admixture of transition metal salt, protective agent e.g. citrate, and alkali (ammonium hydroxide) is preferably allowed to stand for 5–20 hours at room temperature to ensure complex formation. When the complexing formation is complete, the addition of the alkali metal salt of the desired substrate material such as sodium metasilicate will produce no precipitation of the transition metal ion hydroxide or oxide.

The preferred inert supporting materials upon which the high surface area transition metal is dispersed and which will precipitate in accordance with the practice of the instant invention are: sodium or potassium metasilicate, sodium or potassium aluminate, or mixtures thereof.

The alkali metal borohydride which is employed in the instant process to reduce the transition metals may be either sodium, potassium or lithium borohydride. The most preferred alkali metal borohydrides are sodium borohydride and potassium borohydride. The amount of alkali metal borohydride which is contacted with the chelating agent complex solution may vary from about one to one hundred times the chemical equivalent weight (formula weight of the metal ion divided by its valence) of transition metal ion present and is preferred in large excess i.e. five to twenty times the chemical equivalent weight, to effect rapid reaction. Since the protons produced by borohydride reaction are involved in the SiO$_2$ precipitation, the desired amount may also be influenced by the quantity of SiO$_2$ to be precipitated.

The ratio of the supporting material to the transition metal employed may range from about 1 to 1,000 and more preferably from about 4 to about 100 times the chemical equivalents of metal ion to be deposited such as to produce final catalysts having metal content of 0.1 to 50 wt. percent metal and preferably 1 to 20% (wt.).

In addition to performing the above-described reactions in an aqueous medium, a catalytic amount of a strong mineral acid may be added to the above-described solution in order to initiate the borohydride reaction. Borohydride reduction reactions are highly autocatalytic and once initiated proceed vigorously. However, a small amount of a mineral acid may be added to initiate the reaction when temperatures in the range of 40° to 80° C. are employed. The mineral acids which may be employed in the practice of this invention to initiate the borohydride reaction include sulfuric acid, hydrochloric acid, nitric acid and the like. The amount of mineral acid initiator that is added to the solution may vary in the range of from about .05% to 5% and more preferably from about .1 to 1%. Prior to the addition of a mineral acid, the reaction mixture is generally heated to a range of from about 30 to about 100° C. and more preferably from about 40° to about 60° C.

Having now described this invention, this invention may be more clearly understood by reference to the following example. However, no limitations are to be implied by this example over and above those contained in the claims appended hereto, since variations and modifications would be obvious to those skilled in the art.

EXAMPLE 1

The simultaneous precipitation of a cobalt-on-silica catalyst was effected as follows:

5.24 cubic centimeters of a 1 normal cobalt nitrate solution [$CO(NO_3)_2$], 7.10 cubic centimeters of a 1.5 normal sodium citrate solution, 26.70 cc. of 15.35 normal solution of ammonium hydroxide were diluted to 50 cc. with distilled water. Ten cubic centimeters of this cobalt-citric complex solution were added to a solution of 0.5 equivalent (chemical equivalent weight) of sodium metasilicate in 50 cc. of distilled water. Thereafter, 0.1 equivalent of sodium borohydride were added to this solution and the solution was heated to 40° C., with gentle stirring. Three drops of three molar sulfuric acid was then added to initiate the borohydride reaction, which proceeded vigorously.

After about 10–30 seconds the vigorous reaction was complete and simultaneous precipitation of the metallic cobalt-on-silica had occurred. The washed and dried cobalt-on-silica catalyst from this experiment contained about 1% metal content dispersed on the high-area substrate.

What is claimed is:
1. A process for preparing a high-surface-area heterogeneous catalyst which comprises:
  (a) forming a solution of a transition metal compound of a metal selected from the group consisting of cobalt and nickel and mixtures of said compounds with a complexing agent selected from the group consisting of citrates, tartrates and amines in an alkaline solution wherein the pH of the solution is in the range of from about 12 to about 14;
  (b) admixing said solution containing the transition metal and the complexing agent with an alkali metal compound selected from the group consisting of alkali metal silicates and aluminates;
  (c) admixing an alkali metal borohydride to the said solution containing the transition metal, the complexing agent and the alkali metal compound;
  (d) adding a catalytic amount of a mineral acid to the said solution at a temperature in the range of from about 40° to about 100° C. and thereafter recovering said catalyst.
2. The process of claim 1 wherein the complexing agent is an alkali metal citrate.
3. The process of claim 2 wherein the alkali moiety of the alkali metal compound is selected from the group consisting of sodium and potassium.
4. The process of claim 1 wherein the alkali metal borohydride is sodium borohydride.
5. A process for preparing a high-surface-area heterogeneous catalyst by the simultaneous precipitation of a reduced transition metal on a support which comprises:
  (a) admixing a solution of a transition metal compound of a metal selected from the group consisting of cobalt and nickel and mixtures of said compounds, wherein the Normality of the solution of the transition metal compounds employed varies between about 0.01 and about 2, with a solution of a complexing agent consisting essentially of an alkali metal salt of an organic compound selected from the group consisting of citrates and tartrates said solution of the complexing agent being at least equal in Normality to the transition metal compound;
  (b) adding an alkali in an amount sufficient to bring the pH of the solution formed in step (a) to a range of from about 12 to about 14;
  (c) admixing said solution formed in step (b) with an alkali metal supporting compound selected from the group consisting of sodium metasilicate, potassium metasilicate, sodium aluminate and potassium aluminate, wherein the ratio of said supporting compound to the transition metal compound employed is in the range of from about 1 to about 1000;
  (d) admixing said solution formed in step (c) with an excess of an alkali metal borohydride;
  (e) adding a catalytic amount of a mineral acid to the said solution at a temperature in the range of from about 40° to about 100° C. and thereafter recovering said catalyst.
6. The process of claim 5 wherein the transition metal compound is cobalt.
7. The process of claim 5 wherein the complexing agent is sodium citrate.
8. The process as in claim 5 wherein the alkali added in step (b) is sodium hydroxide.
9. The process as in claim 5 wherein the supporting compound is sodium metasilicate.
10. The process as in claim 5 wherein the alkali metal borohydride is sodium borohydride.

References Cited

UNITED STATES PATENTS

| | | | |
|---|---|---|---|
| 2,658,875 | 11/1953 | Schuit et al. | 252—452 |
| 2,717,889 | 9/1955 | Feller et al. | 252—432X |
| 2,921,971 | 1/1960 | Holm et al. | 252—452X |
| 3,092,613 | 6/1963 | Kennerly et al. | 252—432X |
| 3,398,199 | 8/1968 | Walde | 252—432X |
| 3,407,243 | 10/1968 | Hyde et al. | 252—432X |

DANIEL E. WYMAN, Primary Examiner

C. F. DEES, Assistant Examiner

U.S. Cl. X.R.

252—452, 459, 466